Figure 1:
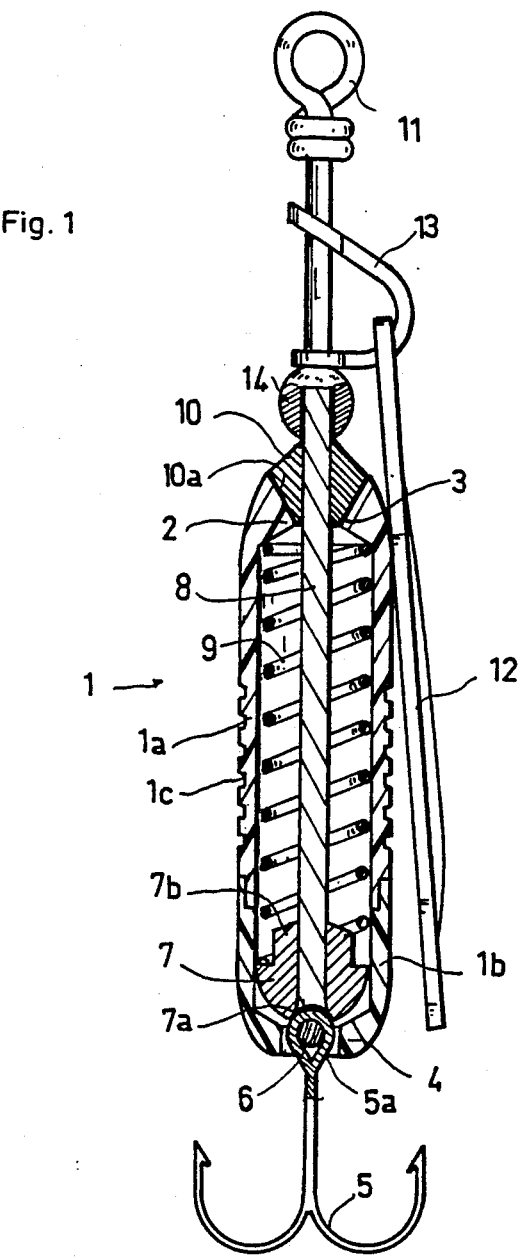

United States Patent [19]

Giraudo et al.

[11] Patent Number: 4,748,763

[45] Date of Patent: Jun. 7, 1988

[54] FISHING DEVICE PROVIDED WITH AT LEAST ONE HOOK

[76] Inventors: Pierre Giraudo, 53, route de Blagnac; Jean P. Ruggeri, 49, route de Blagnac, both of 31200 Toulouse, France

[21] Appl. No.: 14,274

[22] Filed: Feb. 12, 1987

[30] Foreign Application Priority Data

Feb. 12, 1986 [FR] France .................. 86 01994

[51] Int. Cl.$^4$ ............................................ A01K 85/00
[52] U.S. Cl. .................... 43/42.72; 43/17.1; 43/42.02
[58] Field of Search .................. 43/17.2, 42.02, 42.72, 43/43.12

[56] References Cited

U.S. PATENT DOCUMENTS

| | | | |
|---|---|---|---|
| 1,444,876 | 2/1923 | Hanson | 43/42.72 |
| 2,606,390 | 8/1952 | Farmer | 43/42.72 |
| 2,739,407 | 3/1956 | Godsey | 43/42.72 |
| 3,037,315 | 6/1962 | Klawitter | 43/17.2 |
| 4,514,926 | 5/1985 | Weber | 43/17.2 |

FOREIGN PATENT DOCUMENTS 13048 of 1906 United Kingdom .............. 43/42.72

Primary Examiner—Gene P. Crosby
Attorney, Agent, or Firm—Harold H. Dutton, Jr.

[57] ABSTRACT

The invention relates to a fishing device with at least one hook (5) and capable of freeing said hook in case of accidental jamming or snagging. This device comprises a hollow body (1) on which the hook hinges directly, a spring (9) within the body and resting inside it at the end away from the hook, and a sliding rod (8) passing through the body. An inner mass (7) is solidly joined to the rod and arranged to be a rest for the spring and to strike the hook when said spring is released. An external mass (10) is fixed on the rod outside the body at the end away from the hook so as to strike the body during the spring release, essentially at the time the inner mass (7) is impacted.

9 Claims, 4 Drawing Sheets

FISHING DEVICE PROVIDED WITH AT LEAST ONE HOOK

The invention relates to a fishing device provided with at least one hook, and adapted to permit freeing of the hook if accidentally caught or jammed.

In U.S. Pat. No. 3,037,315 there is described a fishing device of the above type which essentially combines the following means: a hollow body, a tail extending from the body and to which is attached the hook, a spring housed in the body and a sliding rod attached to the line and passing through the body to hit the tail when the spring expands. This rod allows compressing the spring by pulling on the line when the hook is caught and represents a mass transmitting to the hook-bearing tail a freeing impulse when the spring expands due to relaxing the line.

In some cases such a device permits freeing the hook. However experiment shows its effectiveness is only mediocre, in particular when the caught hook is out of alignment with body and line. It is a very frequent occurrence in practice that the hook snags on an obstacle in an actual situation (tree trunks at the bottom of the water, branches, rocks...). It even happens sometimes when at certain angles, that the impulse applied to the tail (which is linked to the hook by mutually engaging eyelets) tends to narrow further the angle between the hook and the body and thus to drive the hook deeper into the obstacle.

Moreover, the hook is wholly free to rotate at the end of the tail and it may be in a disadvantageous position to grapple with the fish.

The the present invention proposes to provide an improved device free from the drawbacks of the device cited above.

A main object of the invention is to create a device which is highly effective in freeing the hook no matter how it is caught, even if deeply entangled.

Another object is to provide a device that can orient the hook into an advantageous position to approach the fish while averting the danger of losing the fish after striking it.

To that end, the device provided by the invention, positioned between at least one hook and a line to free the hook in case of accidental jamming or snagging, comprises a hollow body provided at one end with a base, spring means located inside the hollow body and resting against its base with a sliding rod passing through the base and being fastened to the line outside the body, and an inner mass solidly joined to the rod and mounted within the body so as to form a rest for the spring means to make possible the compression thereof; according to the present invention, the device is characterized in that:

the hook is directly hinged on the body at the end away from the base by means of a hook terminal penetrating the end of the body, the inner mass is mounted within the body so as to directly strike the hook terminal when the spring means is released, a second so-called outer mass is fixed externally on the rod facing the body base in a suitable position to strike the body when the spring means are released and essentially at the time the inner mass impacts the hook terminal.

Experiments have shown that the device of the invention allows a remarkably effective freeing of the hook even if it is deeply snagged. This effect provides, on one hand, for the direct impact action from the inner mass which directly strikes the hook terminal (that is, an element integral with the hook), and on the other hand of the conjunction of the simultaneous impacts on the body and the hook. In particular, an impact limited to the hook often is inadequate to free it, whereas the double strike transmits an impulse in the direction of the hook to the body and avoids that the body undergo at the time of freeing a force in the direction opposite to the hook (by spring reaction) which would reduce or neutralize the impulse from the inner mass on the hook.

In a preferred embodiment, the hook terminal comprises a ring formed by the extremity of the hook shank and engaged around a spindle solidly joined to the body so that the hook can pivot about this spindle.

In another feature of the invention, the inner mass includes means resting against the hook ring and designed to straighten the hook again when the mass makes contact with the ring. This design step further improves the freeing effect: the direct impact of the inner mass on the hook terminal is simultaneous with the straightening of the hook if oblique. The impulses therefore act in a direction which is advantageous for the hook (the common direction of the hook and body or slightly away from it).

Moreover, while fishing, the inner mass rests against the hook ring and tends to elastically keep the hook in the straightened position, whereby it assumes an advantageous orientation to go after the fish. After the fish has bitten the hook, this hook regains its freedom because the inner mass withdraws into the body and no longer rests against the hook terminal. In this manner the hook may freely revolve about its spindle, and thereby there is no danger of losing the fish after it has struck.

The inner and the outer masses preferably are shaped in such a manner as to center the rod sliding in the body, this body being cylindrical inside.

Figure 3:
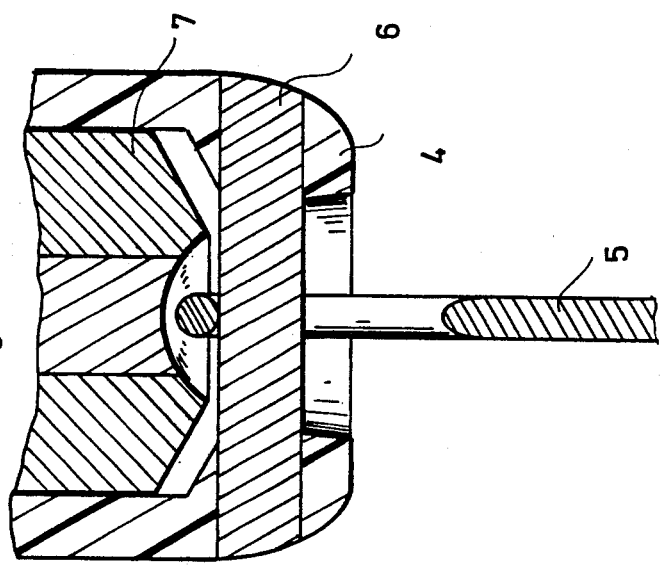
Figure 2:
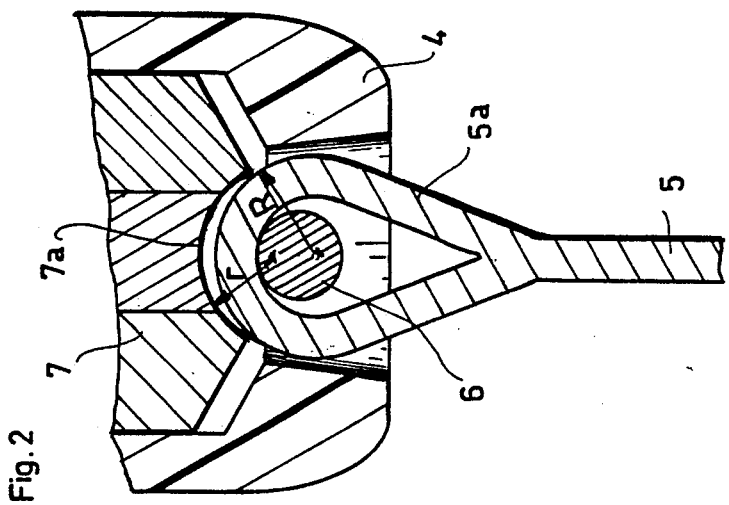
Figure 4:
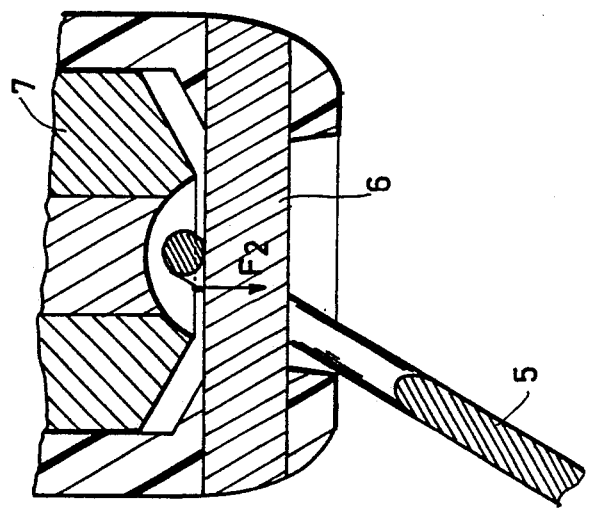
Figure 5:
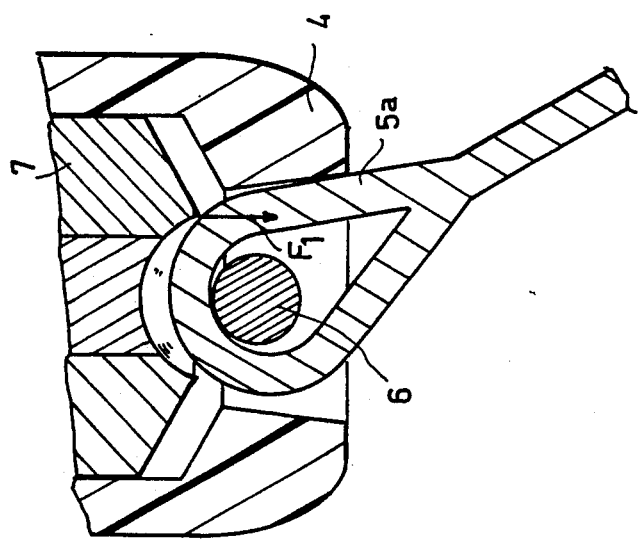
Figure 6:
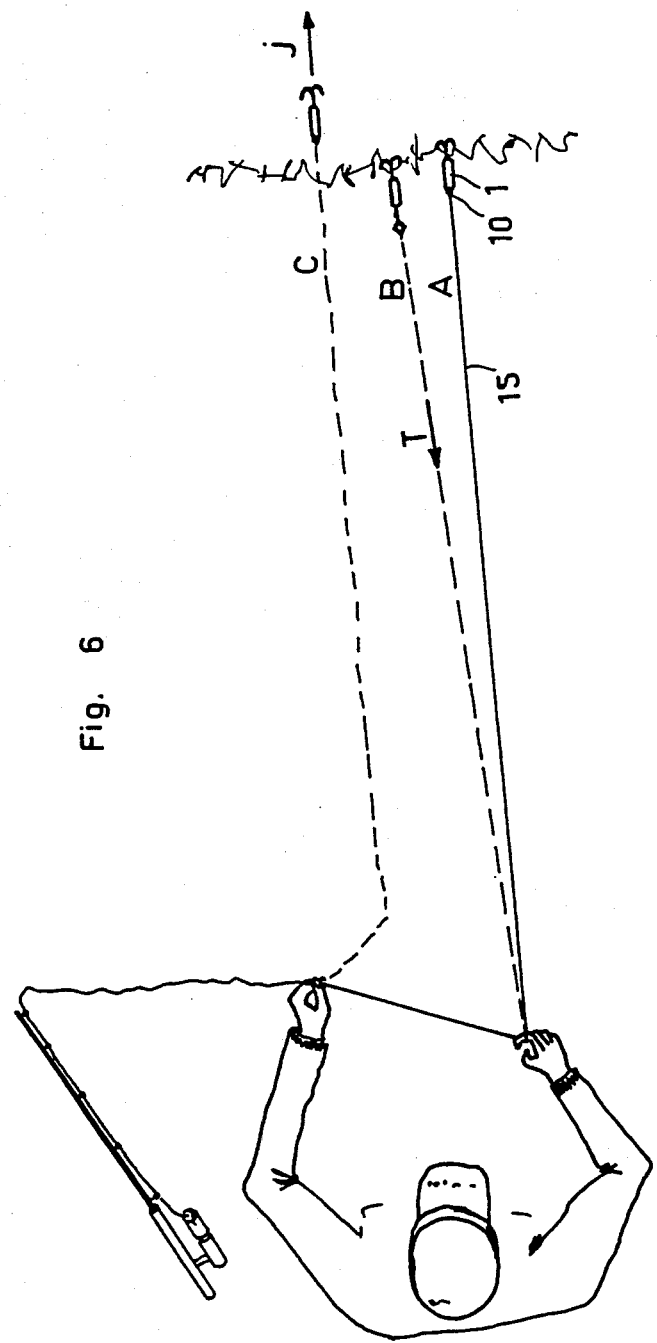

Other features, purposes and advantages of the invention shall become clearer from the description to follow and in relation to the attached drawings which in nonrestrictive manner illustrate an embodiment mode, these drawings being an integral part of the invention:

FIG. 1 is an axial sectional view on an enlarged scale of a device according to the invention, FIG. 2 is a detailed sectional view through the same axial plane as in FIG. 1, FIG. 3 is a detailed sectional view in a plane orthogonal to the previous one, FIGS. 4 and 5 are explanatory diagrams of the operation of the device, FIG. 6 is a diagram illustrating the use of the device.

The device illustratively shown in the figures is intended to be used with a fishing line in order to connect a hook to it and to allow freeing in case of snagging or accidental jamming on an obstacle.

This device comprises a hollow body 1 of a generally cylindrical shape, with a hollow cylindrical core. At one end the body is provided with a base 2 having an axial, outwardly flaring passage in order to form a frustoconical seat 3.

The body 1 is open at the end opposite the base and comprises a peripheral flange 4 pointing to its inside.

The body is comprised of two parts, 1a and 1b fitted and joined into each other. In the example shown, the device constitutes a spoon-type bait and the part 1a comprises on its outside a helical groove 1c which is conventional in this bait design.

At its open end, the body 1 supports a hook 5 of conventional design and with a hook terminal 5a. This terminal consists of a ring mounted around a spindle 6; this spindle is solidly joined to the body and is arranged in such a way as to perpendicularly intersect the body axis. This spindle 6 may be force-fitted into apertures on either side of the part 1b so as to be disassemblable by force in order to install or take off the hook 5.

The spindle 6 is located at the level of the flange 4 and thereby the hook may freely rotate by 360°, the pivoting motion being limited by the ring 5a hitting the flange 4. This flange may be so arranged relative to the spindle and the ring that a maximum pivot motion through an angle of 30° (half angle at the top of the pivoting cone) is possible for the hook.

The body furthermore comprises an inner mass 7 mounted on the end of a rod 8 which can slide along the longitudinal body axis.

At the end of the excursion, the mass 7 comes to rest against the hook ring 5a by rests consisting of a concave surface 7a in the mass and opposite the ring; this concave surface has a radius of curvature r less than the radius R of the ring in the plane perpendicular to the spindle 6 (the plane of the sections of FIGS. 1 and 2).

As shown by FIGS. 4 and 5, the rest or the impact of the mass 7 on the ring 5a tends to straighten the hook toward the body longitudinal axis when this hook is oblique regardless of the direction of this obliqueness: the contact made by the mass 7 is then eccentric relative to the center of rotation of the ring and applies a force $F_1$ or $F_2$ producing a movement to return the hook to its central position.

On its inside, the inner mass 7 is provided with a centering stud 7b around which is engaged the end of a helical-type spring 9 repelling the mass toward the ring 5a.

This spring 9 extends around the sliding rod 8 and rests by its other end against the body base 2.

The sliding rod 8 crosses the body through an axial passage in its base and supports on the outside another mass 10, called the external mass.

This external mass comprises a frustoconical segment 10a matching in its shape the seat 3 in order to be received by the latter when the spring is relaxed. The external mass 10 is fastened to the rod in the longitudinal direction so that it comes to rest in the body seat when the inner mass 7 itself rests against the hook ring 5a.

Accordingly, a pull on the rod 8 will compress the spring 9 and separate the masses 7 and 10 from their respective supports: releasing the rod also releases the spring which expands and at the end of the excursion the two masses simultaneously will impact their respective rests, the ring 5a and the body 1.

Outside the body, the rod is equipped with an end in the shape of a line fastening eye 11. For the case of a spoon type bait, a rotating arm 12 is linked to a buckle 13 mounted on the rod 8 so as to be rotary around it, a ball 14 acting as a revolving stop for the base of this buckle.

Obviously the device of the invention may be part of a different kind of bait: fish-hook, swimming fish ... etc. It may fit both a single hook or several hooks holding bait.

FIG. 6 illustrates the use of the device. In case of snagging the hook 5 (position A), the fisherman applies a one-hand pull T on the line 15 to compress the spring inside the body and to move the two masses 7 and 10. By means of the other hand, he keeps the advanced line in place. Then he abruptly lets go of the line from the first hand (position C): the spring expands, driving the two masses which then simultaneously strike their respective rests; the body therefore receives an impulse in the direction of the arrow J while the hook receives an impulse also in the same direction. By combining these impulses and due to the straightening effect, the hook is roughly repelled away from the obstacle forming the snag and hence is freed.

I claim:

1. A fishing device provided with at least one hook (5) to be fastened to a line for permitting unhooking of said hook in case of accidental jamming or snagging, the device comprising a hollow body (1) having on one end a base (2), spring means (9) inside the hollow body and resting against its base, a sliding rod (8) crossing said base to be fastened outside the body to the line, and an inner mass (7) solidly joined to the rod and arranged in such a manner within the body as to form a rest for the spring means to allow compressing them, said device being characterized in that the hook (5) is directly hinging on the body (1) opposite to the base (2) by means of a hook terminal (5a) entering the end of the body, the inner mass (7) arranged in such a manner within the body that it will directly strike said hook terminal (5a) when the spring means (9) is released, a second and so-called external mass (10) externally fastened to the rod (8) facing the base (2) of the body in a position designed to strike said body when the spring means (9) is released, essentially at the time of impact by the inner mass (7) on the hook terminal (5a).

2. A fishing device as in claim 1, characterized in that the hook terminal (5a) comprises a ring engaged around a spindle (6) solidly joined to the body (1) in such a manner that the hook can pivot about this spindle.

3. A fishing device as in claim 2, characterized in that the inner mass (7) comprises means (7a) resting against the hook ring (5a) and designed to straighten the hook (5) when said mass (7) makes contact with said ring (5a).

4. A fishing device as in claim 3, characterized in that the inner mass comprises of a concave surface (7a) in the inner mass (7) and facing the hook ring (5a), said concave surface having a radius of curvature (r) less than the radius (R) of the ring (5a) in the plane perpendicular to the spindle (6).

5. A fishing device as in claim 2, characterized in that the end away from the base (2), the body (1) is open and comprises a flange (4) pointing inward and designed to restrict the pivoting motion of the hook (5) by stopping said ring (5a).

6. A fishing device as in claim 2, characterized in that the spindle (6) is force-fitted in disassemblable manner into apertures located on both sides of the body (1).

7. A fishing device as in claim 1, characterized in that the base (2) of the body comprises a seat (3) flaring outward, the external mass (10) having an opposite segment (10a) with a shape matching that of the seat.

8. A fishing device as in claim 7, wherein the body (1) is cylindrical inside, the sliding rod (8) being mounted along its longitudinal axis and crossing the base of the body through an axial passage, characterized in that the outer base seat (3) is substantially frustoconical, the external mass (10) has a frustoconical segment (10a) capable of being received in said seat together with a centering action of the rod (8) by contact with said external mass, the inner mass (7) has a segment matching the shape of the inside of the cylindrical body (1) and can slide within same with some play in order to center the rod (8) near said inner mass (7).

9. A fishing device as in claim 8, wherein the spring means comprises a helical-type spring (9) resting at one end against the body base (2) and at the other end against the inner mass (7) which is provided with a stud (7b) to center said spring.

* * * * *